(12) United States Patent
Fitter

(10) Patent No.: US 6,554,025 B1
(45) Date of Patent: Apr. 29, 2003

(54) MULTIPLE CONTAINER FILLING SYSTEM

(76) Inventor: Johan Christiaan Fitter, 51 Mount Street, Bryanston (ZA)

( * ) Notice: Subject to any disclaimer, the term of this patent is extended or adjusted under 35 U.S.C. 154(b) by 278 days.

(21) Appl. No.: 09/624,925

(22) Filed: Jul. 25, 2000

(30) Foreign Application Priority Data

Jul. 26, 1999 (ZA) ............................................. 99/4778

(51) Int. Cl.⁷ .............................. B67D 5/08; H01M 2/36
(52) U.S. Cl. ........................ 137/571; 138/260; 138/263
(58) Field of Search ............................... 137/260, 571, 137/263, 265

(56) References Cited

U.S. PATENT DOCUMENTS

| | | | |
|---|---|---|---|
| 4,350,185 A | * 9/1982 | Quist | ..................... 137/260 X |
| 4,477,542 A | 10/1984 | Braswell | |
| 4,522,896 A | * 6/1985 | Iseard | ........................ 429/63 |
| 4,544,004 A | 10/1985 | Fitter et al. | |
| 5,356,734 A | 10/1994 | Oureshi | |
| 5,453,334 A | * 9/1995 | Melichar | ................ 137/260 X |
| 5,525,438 A | 6/1996 | Kostrivas et al. | |

FOREIGN PATENT DOCUMENTS

WO   WO 98/40653 A1   9/1998

* cited by examiner

*Primary Examiner*—Kevin Lee
(74) *Attorney, Agent, or Firm*—Alston & Bird LLP

(57) ABSTRACT

A battery watering system includes a filler unit mounted by means of an attachment mechanism to the flanged apertures of a three cell six volt lead acid battery. The filler unit is connected by a supply and drain line to a feed unit in the form of the reservoir tank and pumping assembly including a centrifugal pump, a DC pump motor connected to the pump by a pump coupling, and an auxiliary battery. The pump and the battery form part of a control circuit which includes a current sensing relay having a corresponding set of relay contacts. Water is pumped from the tank into a trough of the filler unit via the supply line. An array of three output ports each include a narrowed inlet, a downpipe extending inwardly into each cell of the battery, and a pair of breather tubes. On completion of the replenishment operation, excess water flows back through the supply and drain line into the tank. The invention extends to the attachment for coupling the filler unit to the battery.

18 Claims, 6 Drawing Sheets

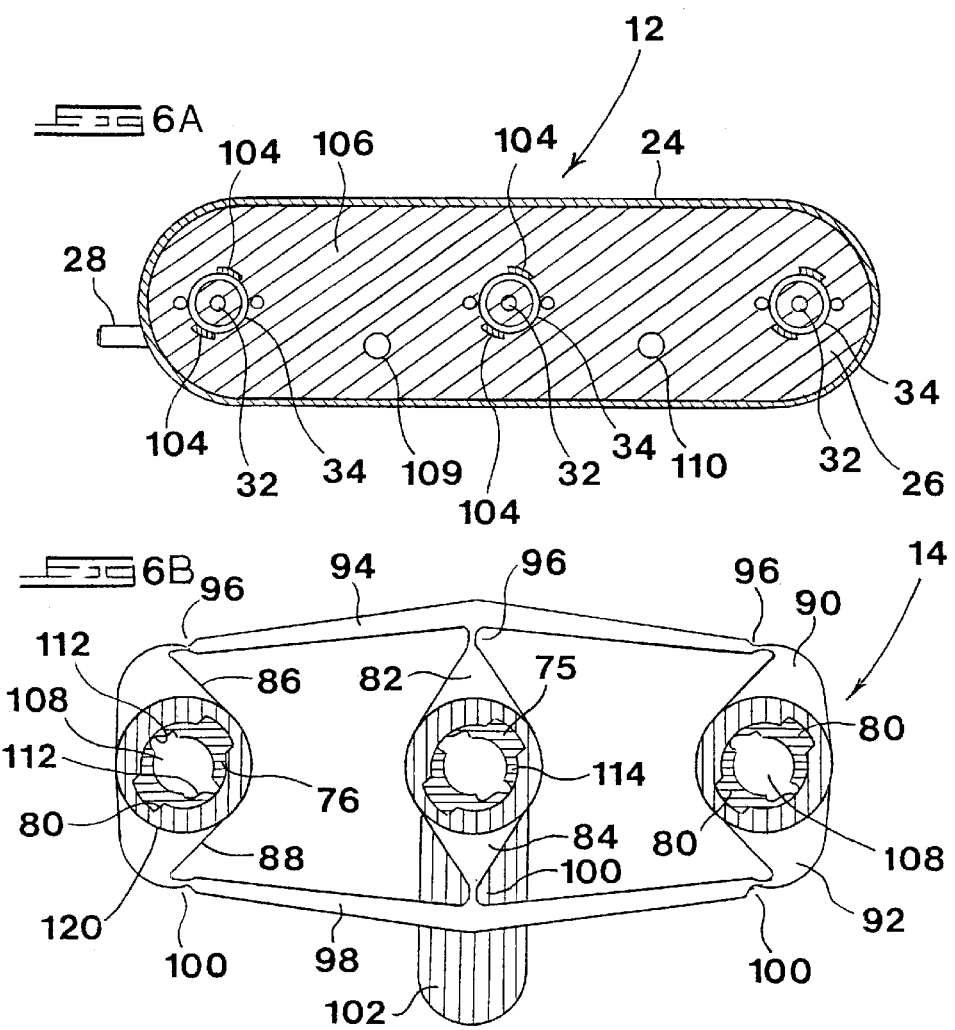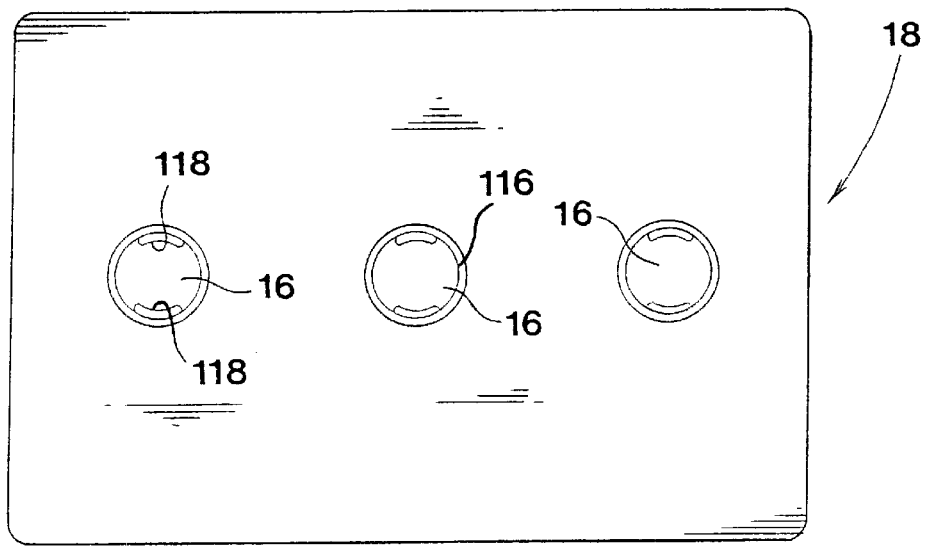

MULTIPLE CONTAINER FILLING SYSTEM

BACKGROUND OF THE INVENTION

THIS invention relates to a filling system for adding replenishment liquid to multiple containers such as battery cells.

Secondary battery cells normally require replenishment water to make up for water lost from the electrolyte due to evaporation and electrolysis. The process for adding water is simple when the number of battery cells is small and the batteries are readily accessible, such as automobile batteries, where battery cells can be inspected and filled manually.

With larger batteries, such as batteries for producing tractive forces and standby power supplies, the number of battery cells is often so large and accessibility so poor, that the task of replenishing by hand can become particularly difficult and time consuming.

A variety of filling systems have been developed which provide requisite water to all the battery cells via a suitable supply line. Conventional systems for providing replenishment water to filler units disposed on the batter include gravity tanks, utility water mains, pressure tanks and pumping arrangements which feed the replenishment water through a conduit arrangement to all the filler units on the batter. Some systems apply replenishment water at an inlet port, and draw out gas and water from an outlet port of the conduit arrangement, and require the entire filling system interior to be sealed off from the surroundings.

There have been designs which utilize the supply pressure of the replenishment water to assist an internal mechanism to turn off the flow of water as the electrolyte reaches the desired level. In another type of design, a pressure sensing tube arrangement detects the rising electrolyte, and a consequent rise in pressure inside the tube arrangement causes a float to rise and close a valve, thereby shutting off the flow of replenishment water into the respective cells.

The control mechanisms of the various types of filler unit are comparatively complex and therefore costly to manufacture. An advantage of the pressure sensing tube arrangement is its comparatively low cost compared to some other designs, but the requisite mechanism for establishing a substantially constant head of liquid in an upper vessel of each filling device may add unnecessary extra cost to the manufacturing process. Furthermore, the installation work required to fit the requisite filler units to a battery entails the plugging in, and individual connecting up of all the individual filler units in a comparatively time consuming operation.

Some of these disadvantages can be overcome by the use of a unitary filler unit similar to that disclosed in U.S. Pat. No. 4,544,044 which provides multiple outlet porting to feed replenishment water simultaneously into all the cells of a multi-celled battery. This example, while possessing some advantages of constructional simplicity over a multiplicity of filler units, does present significant difficulty at installation since it cannot be readily fitted into the screw-in type vent apertures of conventional batteries.

A plug-in arrangement which allows a tray-like multiple vent cap to be fitted into an array of threaded vent apertures on a battery is described in U.S. Pat. No. 3,356,734. Whilst facilitating attachment, these vent caps are readily dislodged in use due to fatiguing of the plastic material of which they are made.

Screw-in arrangements which allow individual ganged vent caps to be fitted into an array of threaded vent apertures are described in U.S. Pat. Nos. 4,477,542 and 5,525,438. Whilst possessing the advantage of remaining in place after installation, these screw-in arrangements require assembly from numerous individual components and are held together by special fasteners which must pivot upon engagement and disengagement with the battery, and are therefore complex and expensive. Furthermore, the positioning of the various actuating arms above the vent caps is incompatible with a unitary construction and therefore precludes the use of this type of mechanism in a simplified filler cap environment.

While the use of individual filler units has been widely accepted in industry, they have not been popular in applications including electrically propelled golf carts. Unitary or ganged adaptations, as exemplified by a variety of vent cap arrangements, have proved elusive for implementation into filling system devices. The cost of installation and operation of available automatic battery filling technology has been to great too overcome the inconvenience of replenishing the electrolyte of the batteries manually.

A solution proposed in International application PCT/US97/04159 involves the incorporation of the entire filler mechanism into the structure of the lid of a battery, thereby eliminating a significant portion of the installation costs. This arrangement does, however, require filler maintenance as well as battery maintenance procedures to address the filler and the battery as a single indivisible unit, thereby incurring maintenance costs equating at all times to the combined maintenance of the filler plus the battery.

Implementation of a viable single point battery filling system for golf-carts has not been held back for a lack of technological improvision, but rather due a lack of cost effective and convenient technology which is appropriate to this application.

SUMMARY OF THE INVENTION

According to the first aspect of the invention there is provided a filling system adapted to replenish a plurality of containers with liquid to a predetermined level within each container, the filling system comprising a feed unit defining a primary liquid reservoir, a filler unit defining a secondary liquid reservoir, and liquid feed and drain means arranged to allow liquid to be fed from the primary liquid reservoir to the secondary liquid reservoir to replenish the containers and to allow surplus liquid not required in the replenishment operation to drain from the secondary liquid reservoir, the filler unit including a plurality of outlet ports arranged to discharge liquid into a corresponding plurality of access openings in the containers.

In a preferred form of the invention, an attachment mechanism is provided for releasably attaching the outlet ports in flowing communication with the access openings.

Conveniently, the liquid feed and drain means comprising a single feed/drain line communicating between the primary and secondary liquid reservoirs, to the extent that the flow of feed liquid is reversed to allow surplus liquid to flow back into the primary reservoir.

Alternatively, the liquid feed and drain means comprises a feed line communicating between the primary and secondary reservoirs and a separate drain line communicating between the secondary reservoir and a separate liquid receiver for receiving surplus liquid from the secondary liquid reservoir.

Advantageously, the secondary reservoir has sufficient capacity to replenish the containers in a single filling operation, and the primary reservoir has sufficient capacity to allow for multiple filling operations of the secondary reservoir.

Preferably, the liquid feed and drain means and the outlet ports are dimensioned to ensure that the containers are replenished prior to the surplus liquid being allowed to drain completely from the secondary reservoir via the liquid feed and drain means.

Conveniently, the filler unit includes level control means for controlling the predetermined level to which each container is filled, and the feed unit includes feed and drain control means for feeding sufficient liquid into the secondary reservoir and for draining surplus liquid from the secondary reservoir.

In one form of the invention, the primary liquid reservoir includes a deformable bladder, and the feed and drain control means includes a pressure plate for operating the bladder, and biasing means for applying a predetermined bias to the pressure plate.

The biasing means may include a counterweight, and retaining means for selectively enabling the counterweight to act on the pressure plate during a downstroke of the pressure plate.

The retaining means may comprise a dished end of the pressure plate for receiving the counterweight, and a retaining bracket adjacent the dished end for temporarily retaining the counterweight on the dished end for facilitating a downstroke of the pressure plate.

In an alternative form of the invention, the feed unit includes an overhead tank arranged to gravity feed liquid into the secondary liquid reservoir via at least one first control valve, with the liquid similarly being drained from the secondary reservoir via at least one second control valve.

In a preferred alternative form of the invention, the primary liquid reservoir includes a feed tank and the feed and drain control means includes a motorized pump for discharging liquid from the feed tank into the secondary reservoir and for receiving surplus liquid from the secondary reservoir, and a control circuit for controlling the operation of the motorized pump.

Advantageously, the control circuit comprises sensing means for sensing when the tank is empty, based on current drawn by the pump motor, and switching means responsive to the sensing means for turning off the motor when the tank is empty.

The filling system is typically a battery watering system, in which the containers are an array of battery cells, and the access openings are conventional flanged cell replenishment apertures arranged to receive cell vent plugs in a screw fit.

The invention extends to an attachment mechanism for releasably attaching an overhead filler unit having a plurality of outlet ports to a plurality of liquid containers having a corresponding plurality of access openings into which the outlet ports are arranged to discharge liquid, the attachment mechanism comprising at least first and second inserts formed with first screw-type fittings and arranged to engage with complemental first screw-type fittings defined within the access openings, a pair of opposed outrigger arms extending from each insert, a pair of actuator arms joined to the ends of the outrigger arms by integrally formed hinges in a parallelogram configuration, and actuator means coupled to the first insert, whereby rotation of the first insert via the actuator means causes simultaneous rotation of the second insert for simultaneously rotating the first screw-type fittings of the first and second inserts into engagement with the complemental first screw-type fittings.

Preferably, the attachment mechanism includes a third insert formed with a first screw-type fitting for locating in a third access opening formed with a complemental first screw-type fitting, the first, second and third inserts being arranged in a linear array with a pair of opposed outrigger arms extending from the third insert and a pair of actuator arms joining the ends of the outrigger arms to the ends of the outrigger arms of the first insert via integrally formed hinges in a parallelogram configuration whereby rotation of the first insert is arranged to cause simultaneous and substantially identical rotation of the second and third inserts.

Conveniently, each of the outlet ports of the overhead filler unit comprises a restricted outlet orifice and a downpipe arranged to extend into an access opening of the liquid container, each of the downpipes being formed with a second screw-type fitting and the inserts being formed with second complemental screw-type fittings which are simultaneously engageable with the second screw-type fittings on rotation of the inserts.

Typically, each of the first screw-type fittings comprise pairs of outwardly extending bayonet lugs arranged to locate behind complemental bayonet ears defined within the access openings in the containers in a bayonet fit.

Advantageously, each of the second screw-type fittings comprise pairs of opposed bayonet lugs extending outwardly from the downpipes and the complemental second screw-type fittings comprise bayonet recesses defined in each of the inserts and arranged to be simultaneously brought into engaging alignment with the bayonet lugs.

The overhead filler unit is typically a battery watering unit, in which the liquid containers are an array of battery cells, and the access openings are conventional flanged cell replenishment apertures arranged to receive cell vent plugs in a screw fit.

By the term "screw-type fitting" is meant any screw or bayonet fitting which employs a rotary or twisting motion.

BRIEF DESCRIPTION OF THE DRAWINGS

FIG. 6A shows an underplan view of a filler unit of FIG. 1;

FIG. 6B shows an underplan view of an attachment mechanism for incorporation with the filler unit of FIG. 6A;

FIG. 8 shows a top plan view of a typical battery lid, excluding battery terminals;

DESCRIPTION OF EMBODIMENTS

Figure 1:
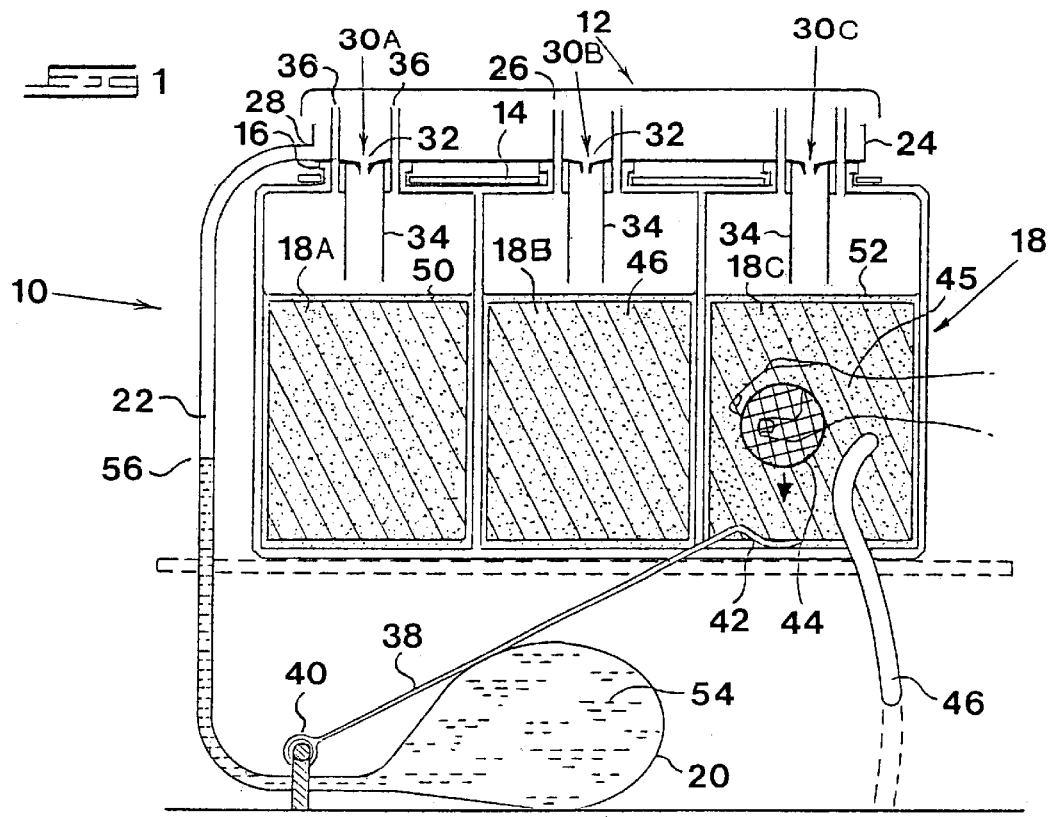
FIG. 1 shows a schematic cross-sectional side view of a first embodiment of the battery watering system or filler unit primed for a filling operation.

Referring first to FIG. 1, a battery watering system 10 includes a filler unit 12 mounted by means of an attachment mechanism 14 to the flanged apertures 16 of a three cell six volt lead acid battery 18. The filler unit 12 is connected to a feed unit defining a primary reservoir in the form of a bladder 20 by means of a supply and drain line 22. The filler unit 12 includes a trough 24 capped by a lid 26. The upper end of the water supply line or pipe 22 is connected to a single input port 28 formed in the side of the trough 24. An array of three output ports 30A, 30B and 30C each include a narrowed inlet orifice 32, a downpipe 34 extending inwardly into each cell 18A, 18B and 18C, and a pair of breather tubes 36. It will be appreciated that the three outlet ports may be extended to include four or more outlet ports.

The feed unit also includes a pressure plate 38 connected at a fixed end to a pivot arrangement 40 and having a dished free end 42 arranged to carry a counterweight 44 shown at the moment of release from an operator's hand 45. A retaining bracket 46 holds the counterweight in position during a downstroke of the pressure plate 38. In each of the cells 18A, 18B and 18C, sulphuric acid electrolyte 46 is maintained at a level 50, which is just sufficient to submerge the battery plates 52. The pressure plate 38 is of a light-weight construction, so that in the unweighted condition it causes water 54 in the bladder 20 to rise approximately halfway up the supply line 22, as shown at 56.

Figure 2:
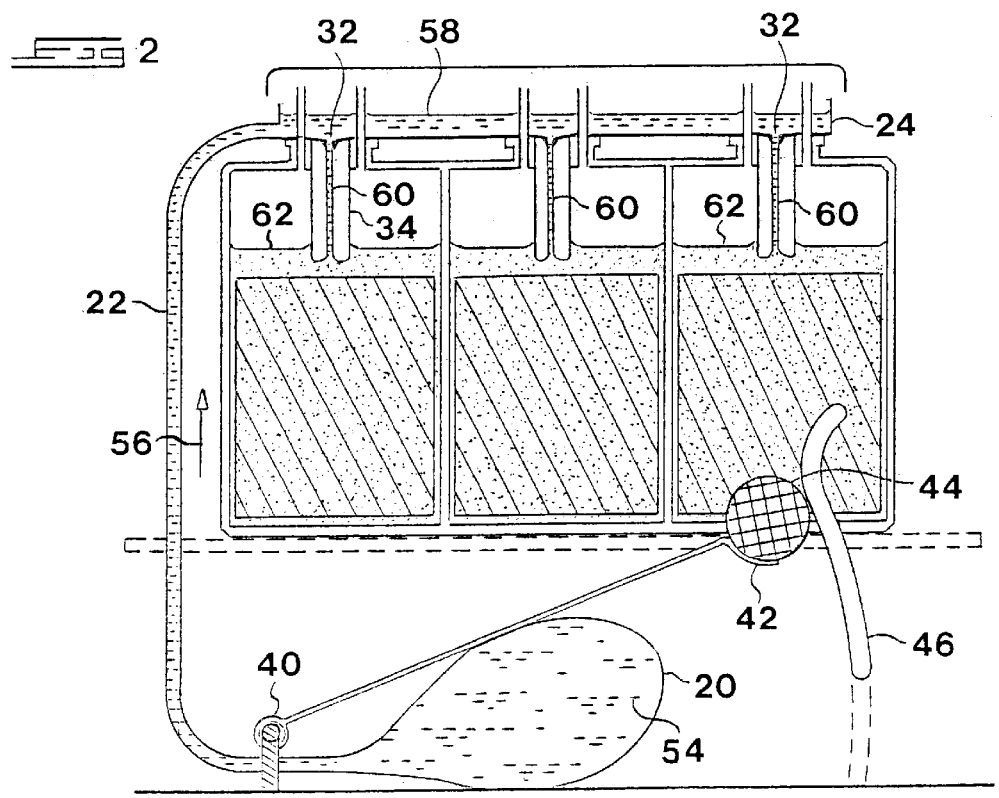
FIG. 2 shows the battery watering system of FIG. 1 at a first stage of operation.

Referring now to FIG. 2, as the counterweight 44 is released onto the dished end 42 of the pressure plate. It applies sufficient pressure to the bladder 20 to cause the water 54 to be displaced into the filler unit 12 via the supply line 22 in the direction of arrow 56 up to a level 58 within the trough 24. This supplies a sufficient head to force the water through the restricted orifices 32 in a narrow streams 60 via the down pipes 34 into respective cells 18A, 18B and 18C of the battery so as to raise the electrolyte to a level 62 within each of the cells. The rate of flow of water into the trough 24 is determined by the weight of the counterweight 44, the mechanical advantage of the pressure plate 38, the inner bore diameter and the length of the conduit 22 and the vertical elevation of the trough 24 above the bladder 20. The rate of outflow of water from the trough 22 is determined mainly by the head of the accumulated water and the dimensions of the outlet orifices 32. Changes in the viscosity of the water play a less significant role.

Figure 3:
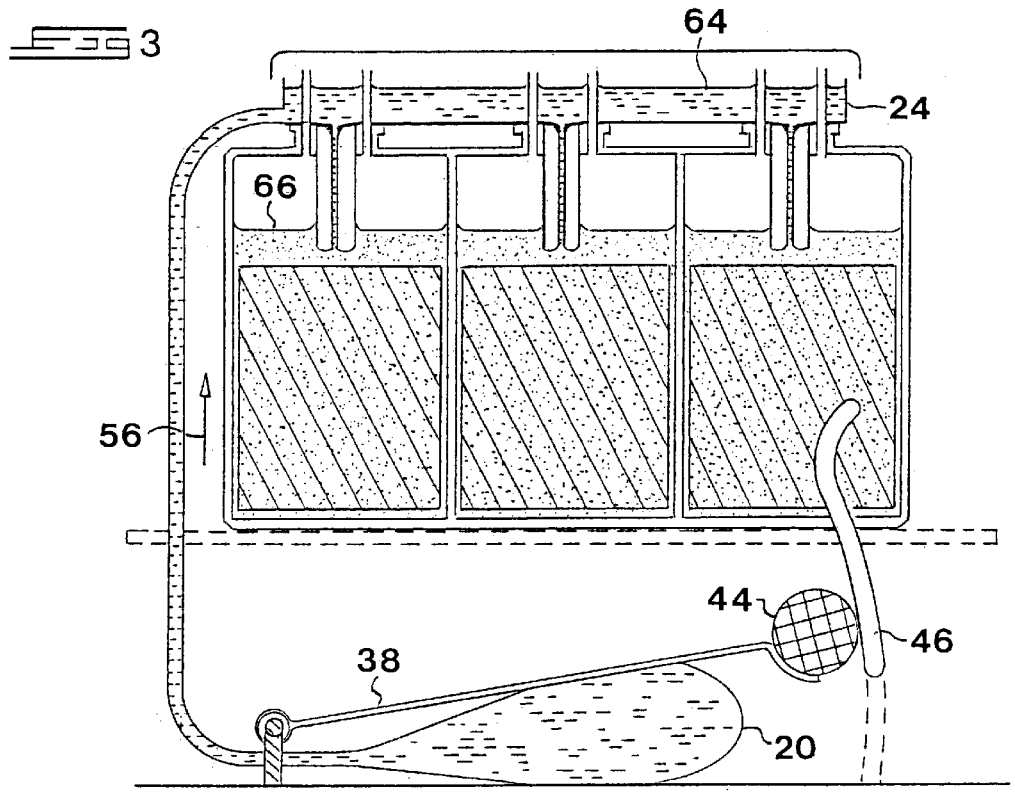
FIG. 3 shows the battery watering system of FIG. 1 at a second stage of operation.

In FIG. 3 the counterweight 44 is shown having flattened the bladder 20 further, thereby displacing more water into the trough 24 up to a level 64, with the electrolyte within the cells having risen to a level 66.

Figure 4:
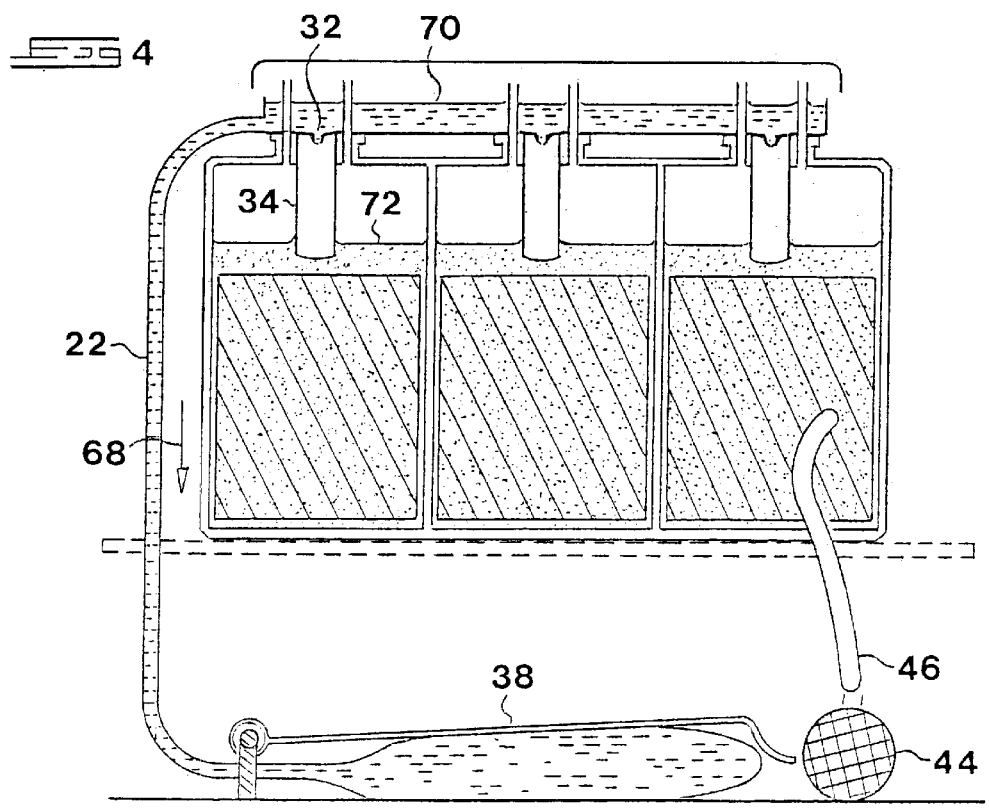
FIG. 4 shows the battery watering system of FIG. 1 at a third stage of operation.

In FIG. 4, the counterweight 44 is shown having been tipped out of the dished end 42 of the pressure plate 38 so to relieve downward pressure thereon. As a result of the reduced pressure, there is a reversal in the direction of a flow of water through the conduit 22, as is indicted by arrow 68, so that the water within the trough drains to a level 70. At the same time, the inflow of water through the orifices 32 ceases once the electrolyte has reached a level 72 within the cells. As the level of electrolyte within the cells rises, each of the downpipes 34 is blocked, with continued rising in the level causing an increase of pressure within each down pipe. This slows the flow of water through each of the orifices 32 to a eventual halt, with a pressure equilibrium being set up in the flowpath defined by each orifice 32 and downpipe 34. The principle of operation governing this type of filling device is more fully described in U.S. Pat. No. 4,544,004, the contents of which are incorporated herein by reference. Various modifications may be made to a filling device of the type described, including the fitting of a baffle plate. Alternative filling devices may also be used.

Figure 5:
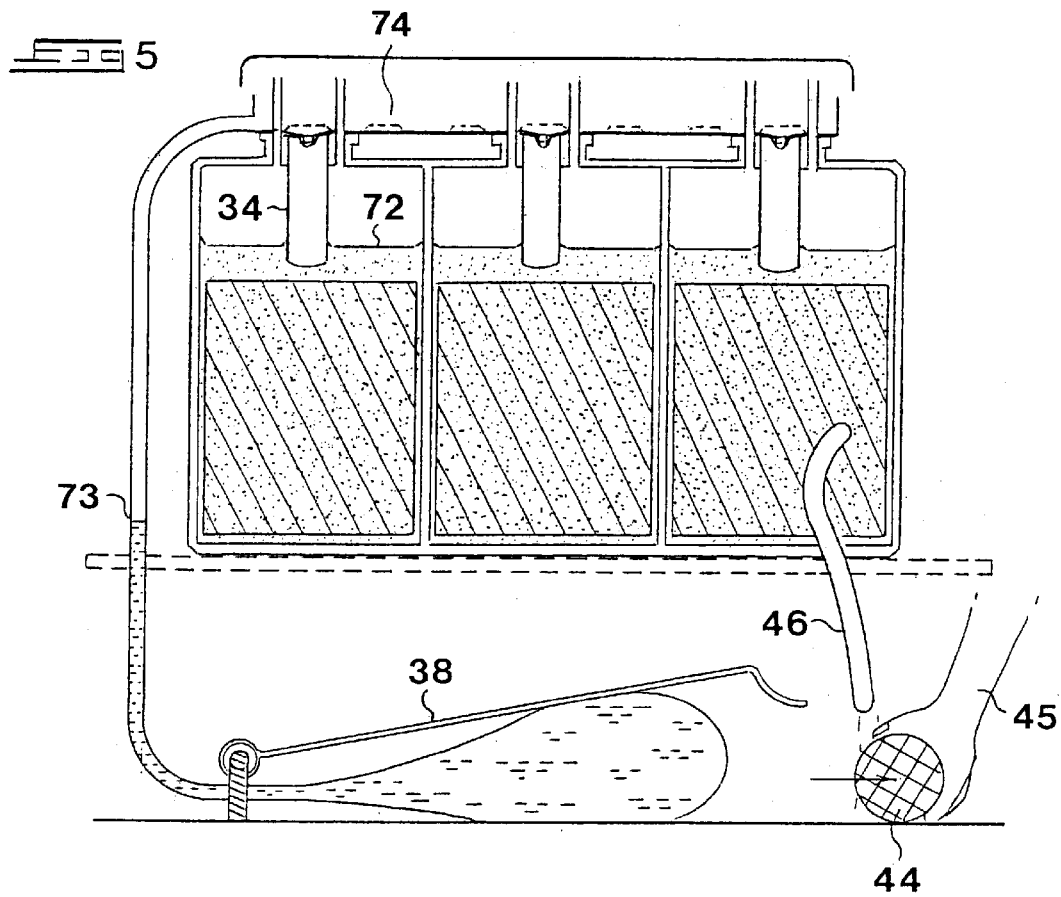
FIG. 5 shows the battery watering system on completion of the filling operation.

In FIG. 5, completion of the watering operation is shown, with the pressure plate 38 being lifted back and the water in the supply line having returned to a position 73, with only remnants 74 of water remaining within the trough 26. The counterweight 44 is then lifted by the operator 45 and replaced on the dished free end 42 once the bladder 20 has been replenished.

It will be appreciated that in most cases the water level within the cells 18A, 18B and 18C are different on commencement of the topping up operation. As a result, the array of output ports 30A, 30B and 30C are each capable of detecting electrolyte level in their own right, and of allowing an independent flow of water into each associated cell to a predetermined desired level, whereafter the flow of water into the cell is terminated. On completion of the filling procedure, however, the electrolyte in all of the cells will have attained substantially the same predetermined desired level 72. The final levels in each of the cells may be varied by providing downpipes 34 having different lengths.

In FIG. 6A it can clearly be seen that the inlet port 28 is offset relative to the longitudinal centre-line of the filler unit 12. The offset position allows water flowing into the rough 24 to flow the length of the trough without being unduly impeded so that it reaches the successive outlet orifices 32 in good time. The resultant balanced flow rate ensures that the battery 18 is filled with replenishment water in the shortest possible time.

Additional filler units similar to the filler unit 12 may be supplied simultaneously from the same bladder 20 by tee-ing additional supply/drain lines onto the line 22 and by increasing the dimensions of the bladder accordingly. A tubular hose coupling [not shown] may also be provided on the supply/drain line 22 for enabling the battery to be used in other locations. Replenishment of the bladder 20 may be provided for directly, or via the supply/drain line 22, in which case a suitable valve arrangement may be employed.

Referring now to FIGS. 6A, 6B and 8, the attachment mechanism 14 and the manner in which it interconnects the filler unit 12 and the battery 18 will be described in more detail. The attachment mechanism 14 comprises a first central insert 75 and second and third outer 76 and 78. Each of the inserts terminate in a pair of outwardly extending bayonet lugs 80. A pair of opposed outrigger arms 82 and 84 extend transversely from the central insert, and similar pairs of outrigger arms 86 and 88 and 90 and 92 extend transversely from the outer inserts 76 and 78. An actuating arm 94 joins the outrigger arms 82, 86 and 90 along integral hinge formations 96, and is substantially parallel to an actuating arm 98 which joins the opposite outrigger arms 84, 88 and 92 at integral hinge formations 100, with the resultant structure constituting a double parallelogram-type linkage. An integral actuating handle 102 extends from an operatively upper end of the insert 75.

Figure 9A:
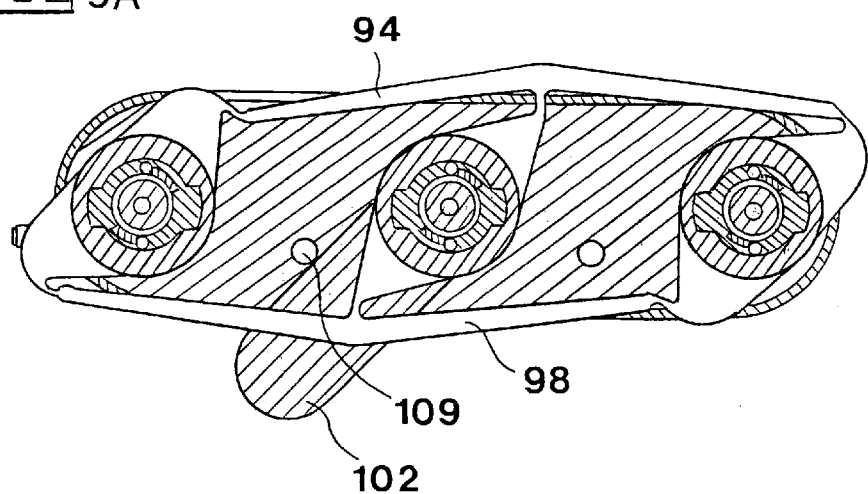
FIGS. 9A, 9B & 9C show underplan views of an assembled filler unit of FIGS. 6A and 6B in the process of being fitted to the battery lid of FIG. 8.
Figure 9B:
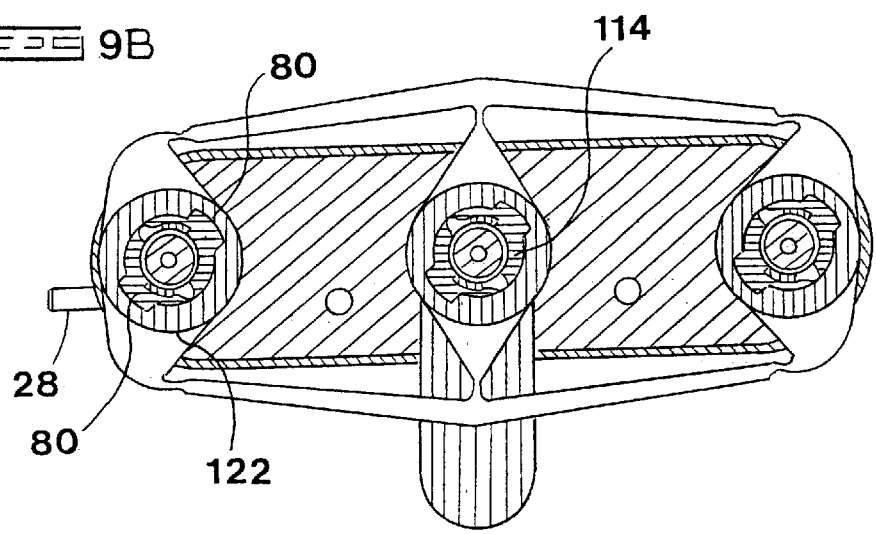
Figure 9C:
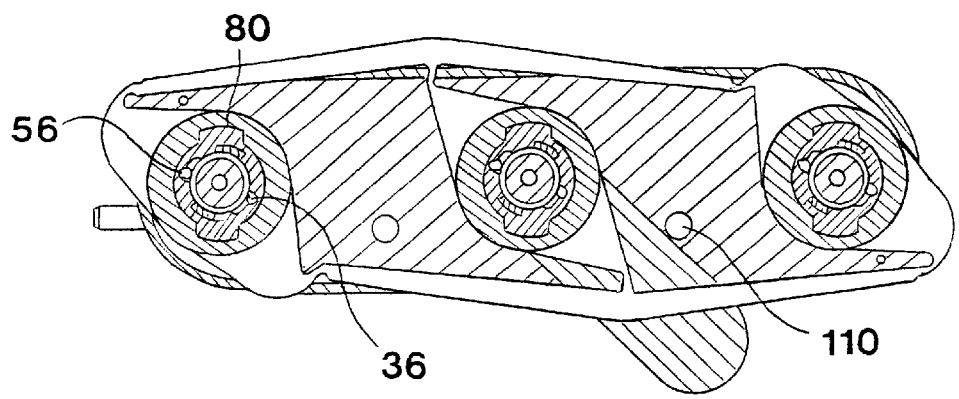

As is clear from FIGS. 9A and 9C, rotation of the actuating handle 102 will cause rotation of the centre insert 75 and simultaneous rotation of the outer inserts 76 and 78 in the same direction and to the same degree, with the rotary motion being transferred via the double parallelogram-type linkage constituted by the outrigger arms, the integral hinges and the actuating arms. The entire attachment mechanism is preferably of unitary construction and is injection moulded from a polypropylene or polypropylene-polyethylene polymer material.

Figure 7:
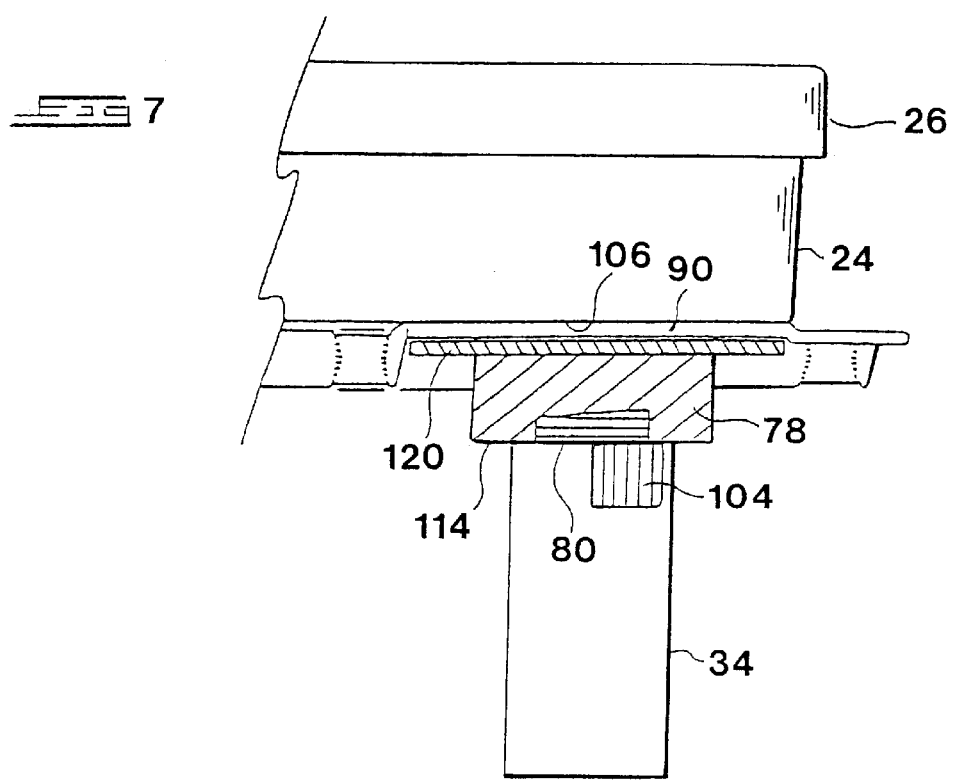
FIG. 7 shows a side view of a detail of the assembled filler unit of FIGS. 6A and 6B.

The downpipes 34 are provided with opposed bayonet lugs 104, and the attachment mechanism 14 is fitted against the under surface 106 of the trough 24 by passing the three downpipes 34 through central apertures 108 defined within the inserts 75, 76 and 78. At this stage, the actuating handle 102 is in the FIG. 6B position, and is located between end stops 109 and 110 extending from the under surface 106 of the trough. The handle is then rotated beyond the FIG. 9A position to a position in which the bayonet recesses 112 defined in each of the inserts are rotated into alignment with the corresponding bayonet lugs 104. This alignment condition takes place when the leading edge of the adjusting handle 102 is move slightly past the end stop 109. The attachment mechanism 14 can then be pushed firmly against the under surface 106 of the trough 24, with the result that the actuating handle 102 overlies the end stop 109. The actuating handle is then snapped back over the end stop 109 into its normal range of travel between the end stops 109 and 110. Return of the actuating handle 102 to its FIG. 9B position will cause the attachment mechanism 14 to be locked firmly behind the bayonet lugs 104 projecting from each of the downpipes, with outermost faces 114 of the inserts bearing against the inner faces of the lugs. FIG. 7 shows the locked position more clearly. In which the uppermost planar surface of the pair of outrigger arms 90 and 92 is shown bearing against the peripheral undersurface of the trough 24. The bearing surfaces provide a degree of vertical compression to the inserts so as to provide a seal between the trough and the inserts.

In order to ensure that all three inserts 75, 76 and 78 rotate in concert about their respective downpipes 34, the centres of the hinges 96 are co-linear, as are the hinges 100, with the straight lines joining the respective sets of hinges 96 and 100 being substantially parallel. As the central hinges 96 and 100 extending from the outrigger arms 82 and 84 are at right angles to the outer hinges 96 and 100 extending from the outrigger arms 90 and 92 and 86 and 88 respectively, the actuating arms 94 and 98 are bowed in a gentle downwardly facing vee-configuration.

Referring now to FIG. 8, the three access apertures 16 in the upper wall 18 of the battery are formed with raised turret portions 116 for facilitating location of the attachment mechanism 14. Projecting inwardly from each of the turret 116 are conventional bayonet ears 118 which are normally adapted to receive matching quarter-turn bayonet-type vent plugs. These vent plugs are removed for receiving the inserts 75, 76 and 78, with the bayonet lugs 80 being similarly adapted to locate behind the ears 118 in a bayonet or quarter-turn screw fit. This is achieved by moving the actuating handle 102 between the FIG. 9A and 9C positions. In the FIG. 9A position, the bayonet lugs 80 are all aligned horizontally so that they are able to nest within the gaps defined between the ears 118. Once the bayonet lugs 80 are located just behind the ears 118 they are rotated through the FIG. 9B position to the FIG. 9C position, in which they are entrapped firmly behind the six ears 118. Retention will be successful even if all the engaging lugs and ears do not fully engage, or if some of the ears or lugs are missing altogether.

In order to facilitate sealing between the connection assembly and turrets 116, in particular in the case of uneven turret rims, annular gaskets 120 are provided. These can be omitted if the rims are smooth.

In the fully engaged FIG. 9C position, the breather tubes 36 are brought into registry with recesses 122 so as to provide a substantially linear passage for gas to travel from the inner cavities of the battery cells to the inner volume of the trough 124. A further arrangement (not shown) may be included to allow gas to pass even in the event of the breather tubes 36 being out of alignment with the recesses 122. The cover 26 is firmly attached to the trough 24, with gaps along the joining being provided to prevent a build-up of gas within the filler unit. The gaps also allow for the emergency overflow of excess water which may have entered the trough inadvertently, before such water overfills the battery cells.

In the case of "n" outlet ports, where "n" is greater than three, the attachment mechanism 14 may be provided with "n" corresponding inserts which are ganged together in the same manner as the three inserts 74, 76 and 78 described above.

Figure 10:
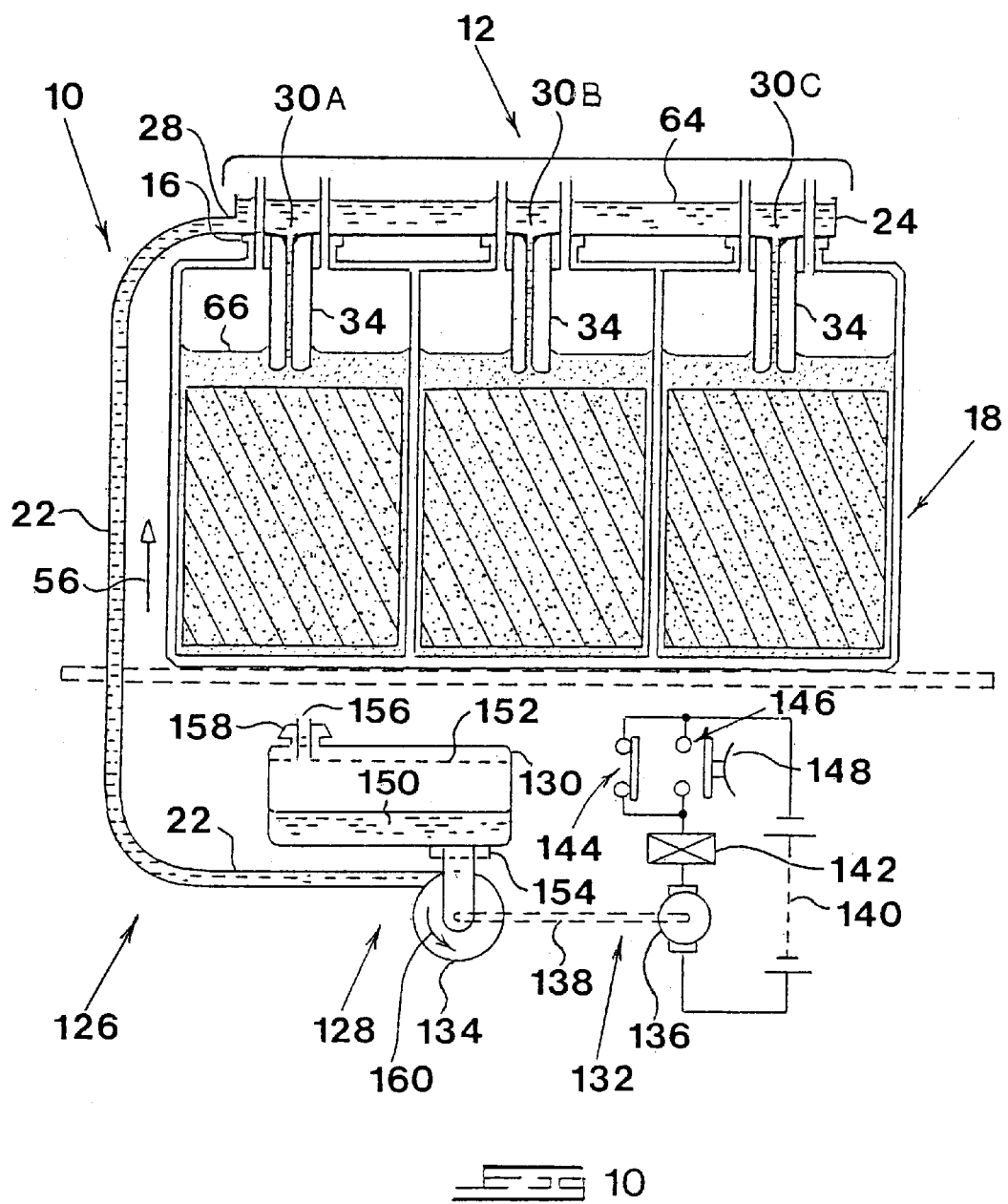
FIG. 10 shows a schematic cross-sectional side view of a second embodiment of a battery watering system of the invention.

Referring now to FIG. 10, a second embodiment of a battery watering system 126 is shown which is provided with alternative liquid feed and drain means 128. A reservoir tank 130 replaces the bladder 20, with the pressure plate 38 and counterweight 44 being replaced by a pumping assembly 132 including a centrifugal pump 134, a DC pump motor 136 connected to the pump by a drive coupling 138, and an auxiliary battery 140.

The pump motor 136 and the battery 140 form part of a control circuit which includes a current sensing relay 142 having a corresponding set of relay contacts 144. A set of manually operable contacts 146 are shunted across the relay contact 144, and are provided with a push button 148. In the control circuit as illustrated, the relay contact 144 is shown as closed, which corresponds to the state of the circuit with the motor 136 running, and drawing current through the relay coil 142. In the event of the current in the circuit falling below a pre-determined threshold value, contacts 144 will open so as to turn off the motor. The rigid reservoir tank 130 contains a quantity of water 150. The effective volume of the tank 130 is similar to that of the bladder 20. In that a volume corresponding to bladder 20 filled to capacity equates to an upper level 152 in the tank.

The pump 134 draws water from the contents of the tank via a duct 154 in the base of the tank. In order to prevent a vacuum from forming within the tank an aperture 156 is defined in an access cap 158 fitted to the top of the reservoir tank 130.

The pump 134, the coupling 138 and the motor 136 are typically incorporated in a single marine-type utility unit operate with a twelve volt automative-type battery, and capable of delivering a good flow of water against the pressure head provided by the filler unit 12. The pump 134 runs in the direction of arrow 160 so as to displace water into the filler unit 12 via the supply line 22. The illustrated condition of the battery watering system 126 corresponds to the FIG. 3 condition of the first embodiment.

Prior to commencement of the filling operation, the motor 136 is stationery and the current sensing relay 142 is a de-energised condition in which the contacts 144 are open. The push button 148 is briefly pressed, completing the electrical circuit including the relay 142, the pump 136 and the battery 140, and sends a surge current due to the motor starting current through the current sensing relay 142, which energises it and causes the contacts 144 to close. This starting current is typically 10 amps, with a running current, during pumping or the water, being in the order of 2 amps. As soon as the reservoir tank 130 is depleted, the load on the motor 136 is considerably reduced to the extent that the running of the unloaded motor 136 falls to between 0.75 and 1 amp. The drop-out current for the current sensing relay 142 is typically set to 1.5 amps. As a result, the current sensing relay 142 remains energised to hold the contacts 144 closed only for as long as there is water 150 in the reservoir tank 130. In this way, the current sensing relay 142 senses when the tank is empty and stops the pump motor 136.

The operating sequence of the battery watering system 126 follows the identical pattern to that of the first embodiment illustrated sequentially in FIGS. 1 to 5. During the pumping phase, water enters the filler unit 12 in the direction of arrow 56, with water draining from the filler unit 12 through the feed pipe 22 in the opposite direction of arrow 68 shown in FIG. 4. Water is able to flow in a reverse direction through the stationary centrifugal pump 134 and back into the reservoir tank 130 almost without impediment. On completion of the watering operation, only remnants of water remain within the trough, as is shown in FIG. 5.

I claim:

1. A filling system adapted to replenish a plurality of containers with liquid to a predetermined level within each container, the filling system comprising a feed unit defining a primary liquid reservoir, a filter unit defining a secondary liquid reservoir, and liquid feed and drain means arranged to allow liquid to be fed from the primary liquid reservoir to the secondary liquid reservoir to replenish the containers and to allow surplus liquid not required in the replenishment operation to drain from the secondary liquid reservoir, the filler unit including a plurality of outlet ports arranged to discharge liquid into a corresponding plurality of access openings in the containers.

2. A filling system according to claim 1 in which an attachment mechanism is provided for releasably attaching the outlet ports in flowing communication with the access openings.

3. A filling system according to claim 1 in which the liquid feed and drain means comprises a single feed/drain line communicating between the primary and secondary liquid reservoirs, to the extent that the flow of feed liquid is reversed to allow surplus liquid to flow back into the primary reservoir.

4. A filling system according to claim 1 in which the liquid feed and drain means comprises a feed line communicating between the primary and secondary reservoirs and a separate drain line communicating between the secondary reservoir and a separate liquid receiver for receiving surplus liquid from the secondary liquid reservoir.

5. A filling system according to claim 1 in which the secondary reservoir has sufficient capacity to replenish the containers in a single filling operation, and the primary reservoir has sufficient capacity to allow for multiple filling operations of the secondary reservoir.

6. A filling system according to claim 1 in which the liquid feed and drain means and the outlet ports are dimensioned to ensure that the containers are replenished prior to the surplus liquid being allowed to drain completely from the secondary reservoir via the liquid feed and drain means.

7. A filling system according to claim 1 in which the filler unit includes level control means for controlling the predetermined level to which each container is filled, and the feed unit includes feed and drain control means for feeding sufficient liquid into the secondary reservoir and for draining surplus liquid from the secondary reservoir.

8. A filling system according to claim 7 in which the primary liquid reservoir includes a deformable bladder.

9. A filling system according to claim 8 in which the feed and drain control means includes a pressure plate for operating the bladder, and biasing means for applying a predetermined bias to the pressure plate.

10. A filling system according to claim 9 in which the biasing means includes a counterweight, and retaining means for selectively enabling the counterweight to act on the pressure plate during a downstroke of the pressure plate.

11. A filling system according to claim 10 in which the retaining means comprises a dished end of the pressure plate for receiving the counterweight and a retaining bracket adjacent the dished end for temporarily retaining the counterweight on the dished end for facilitating a downstroke of the pressure plate.

12. A filling system according to claim 7 in which the feed unit includes an overhead tank arranged to gravity feed liquid into the secondary liquid reservoir via at least one first control valve, with the liquid similarly being drained from the secondary reservoir via at least one second control valve.

13. A filling system according to claim 7 in which the primary liquid reservoir includes a feed tank and the feed and drain control means includes a motorized pump for discharging liquid from the feed tank into the secondary reservoir and for receiving surplus liquid from the secondary reservoir, and a control circuit for controlling the operation of the motorized pump.

14. A filling system according to claim 13 in which the control circuit comprises sensing means for sensing when the tank is empty, based on current drawn by the pump motor, and switching means responsive to the sensing means for turning off the motor when the tank is empty.

15. A filling system according to claim 2 in which the attachment mechanism comprises at least first and second inserts formed with screw-type fittings and arranged to engage with complemental screw-type fittings defined within the access openings, a pair of opposed outrigger arms extending from each insert, a pair of actuator arms joined to the ends of the outrigger arms by integrally formed hinges in a parallelogram configuration, and actuator means coupled to the first insert, whereby rotation of the first insert via the actuator means causes simultaneous rotation of the second insert for simultaneously rotating the first screw-type fittings of the first and second inserts into engagement with the complemental first screw-type fittings defined within the access openings.

16. A filling system according to claim 15 which includes a third insert formed with a first screw-type fitting for locating in a third access opening formed with a complemental first screw-type fitting, the first, second and third inserts being arranged in a linear array with a pair of opposed outrigger arms extending from the third insert and a pair of actuator arms joining the ends of the outrigger arms to the ends of the outrigger arms of the first insert via integrally formed hinges in a parallelogram configuration whereby rotation of the first insert is arranged to cause simultaneous and substantially identical rotation of the second and third inserts.

17. A filling system according to claim 15 in which each of the outlet ports of the overhead filler unit comprises a restricted outlet orifice and a downpipe arranged to extend into an access opening of the liquid container, each of the downpipes being formed with a second screw-type fitting and the inserts being formed with second complemental screw-type fittings which are simultaneously engageable with the second screw type fittings on rotation of the inserts.

18. A filling system according to claim 1 which is a battery watering system, in which the containers are an array of battery cells, and the access openings are conventional flanged cell replenishment apertures arranged to receive cell vent plugs in a screw fit.

* * * * *

UNITED STATES PATENT AND TRADEMARK OFFICE
CERTIFICATE OF CORRECTION

PATENT NO. : 6,554,025 B1
DATED : April 29, 2003
INVENTOR(S) : Fitter

It is certified that error appears in the above-identified patent and that said Letters Patent is hereby corrected as shown below:

Column 9,
Line 14, "filter" should read -- filler --.

Signed and Sealed this

Seventh Day of October, 2003

JAMES E. ROGAN
*Director of the United States Patent and Trademark Office*